No. 776,027. PATENTED NOV. 29, 1904.
I. LARSEN & R. HARDIE.
FRICTIONAL POWER TRANSMISSION DEVICE.
APPLICATION FILED AUG. 19, 1903.
NO MODEL. 3 SHEETS—SHEET 1.

Witnesses:
Inventors:
Ivert Larsen
Robert Hardie
by Pooler Brown
their Attys.

No. 776,027. PATENTED NOV. 29, 1904.
I. LARSEN & R. HARDIE.
FRICTIONAL POWER TRANSMISSION DEVICE.
APPLICATION FILED AUG. 19, 1903.
NO MODEL. 3 SHEETS—SHEET 2.

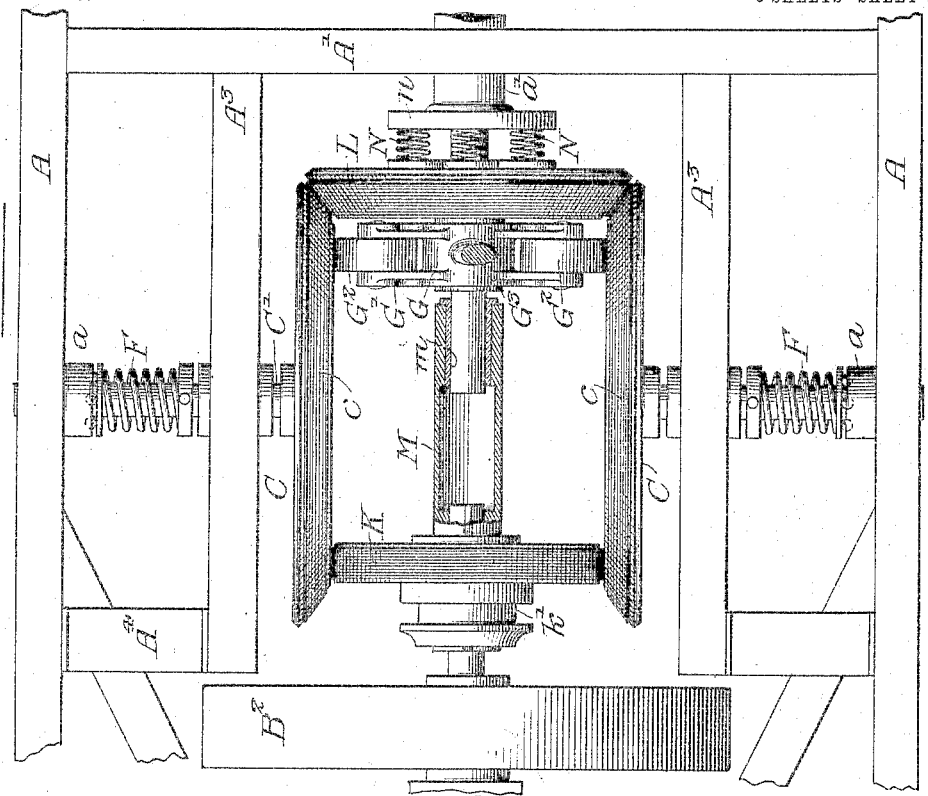
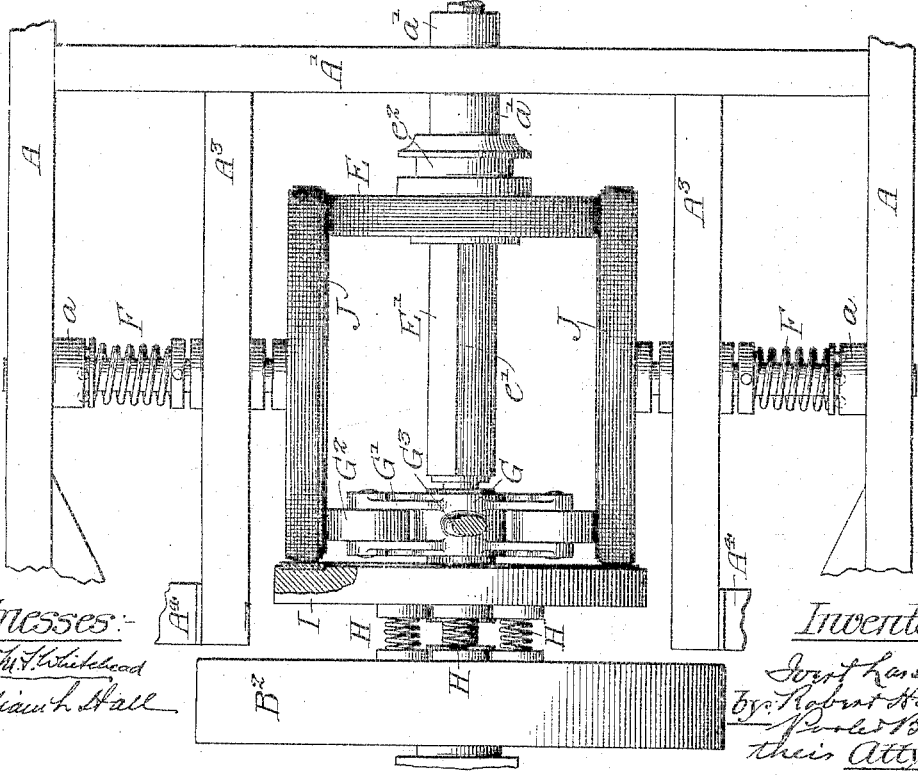

No. 776,027.

Patented November 29, 1904.

UNITED STATES PATENT OFFICE.

IVERT LARSEN AND ROBERT HARDIE, OF CHICAGO, ILLINOIS.

FRICTIONAL POWER-TRANSMISSION DEVICE.

SPECIFICATION forming part of Letters Patent No. 776,027, dated November 29, 1904.

Application filed August 19, 1903. Serial No. 169,996. (No model.)

*To all whom it may concern:*

Be it known that we, IVERT LARSEN and ROBERT HARDIE, of Chicago, in the county of Cook and State of Illinois, have invented certain new and useful Improvements in Frictional Power-Transmission Devices; and we do hereby declare that the following is a full, clear, and exact description thereof, reference being had to the accompanying drawings, and to the letters of reference marked thereon, which form a part of this specification.

This invention relates to improvements in frictional power-transmission devices; and the invention consists in the matters hereinafter set forth, and more particularly pointed out in the appended claims.

The device herein shown is especially applicable for use in automobile construction and is adapted to be interposed between the motor or prime mover of the machine and the driving-wheels and is operated to stop and start the machine, vary the speed thereof, and reverse its direction of movement. The device may be adapted for the transmission of power from a prime mover in any other class of machinery where a variable speed or reversal of movement of the driven part is desired.

Figure 1:
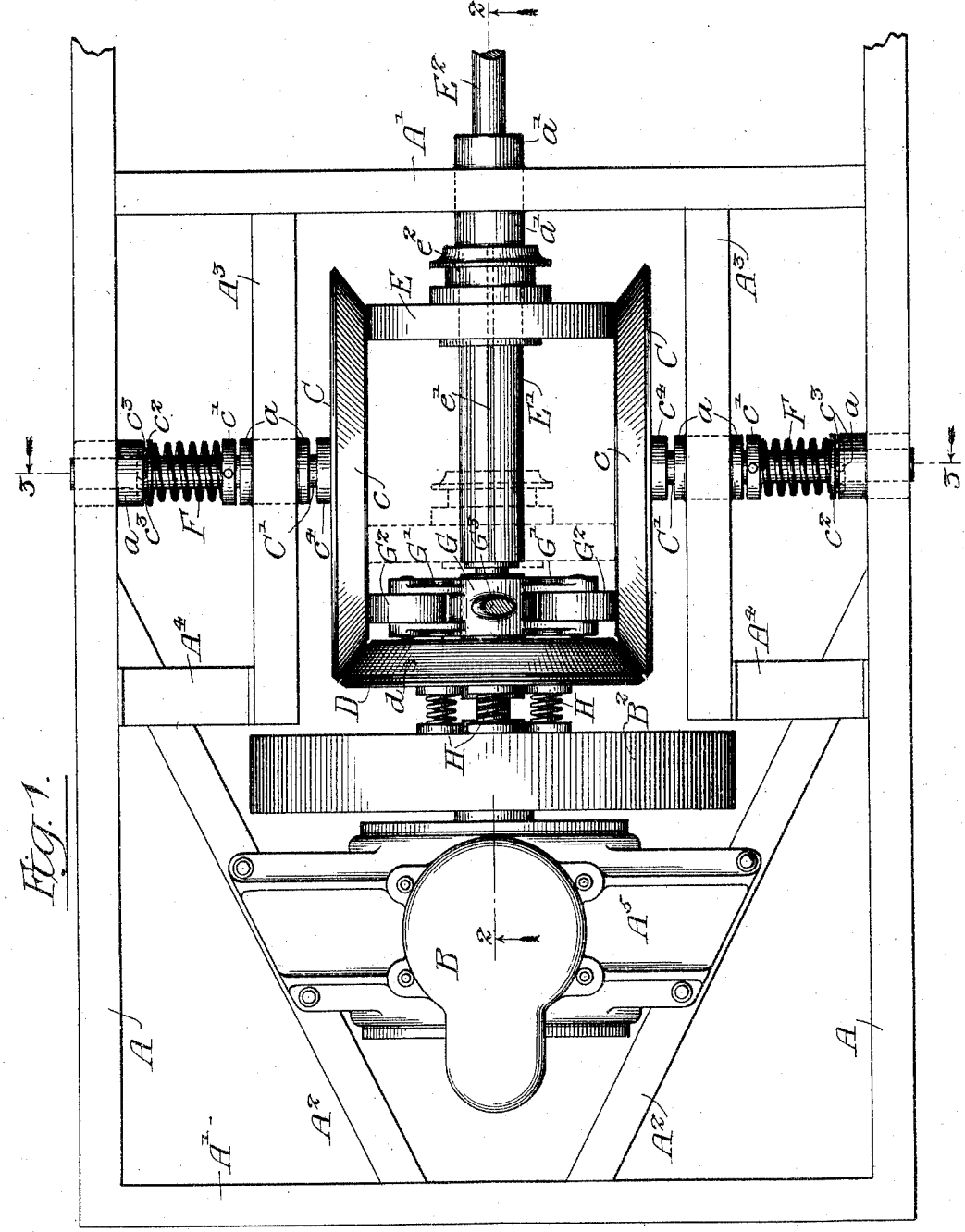
Figure 2:
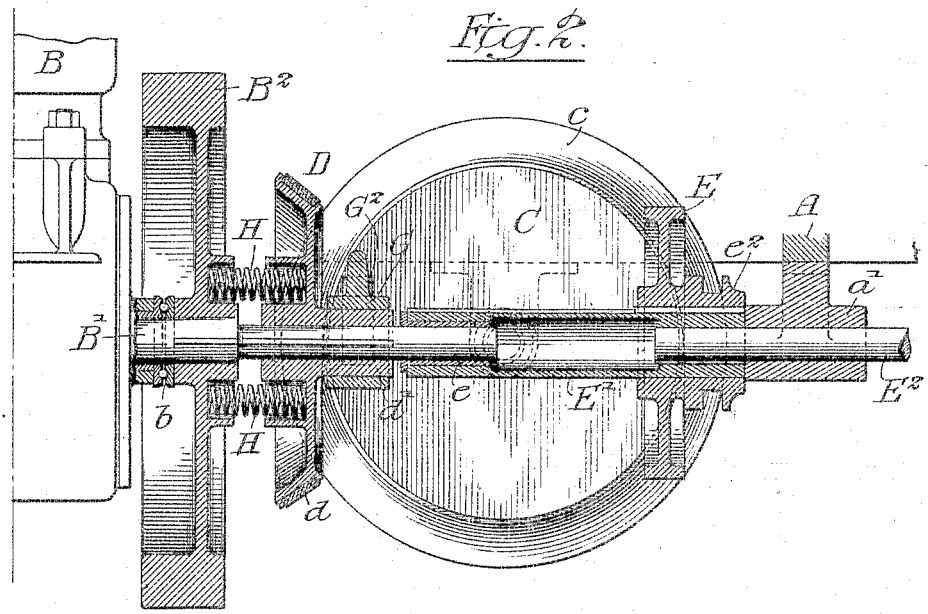
Figure 3:
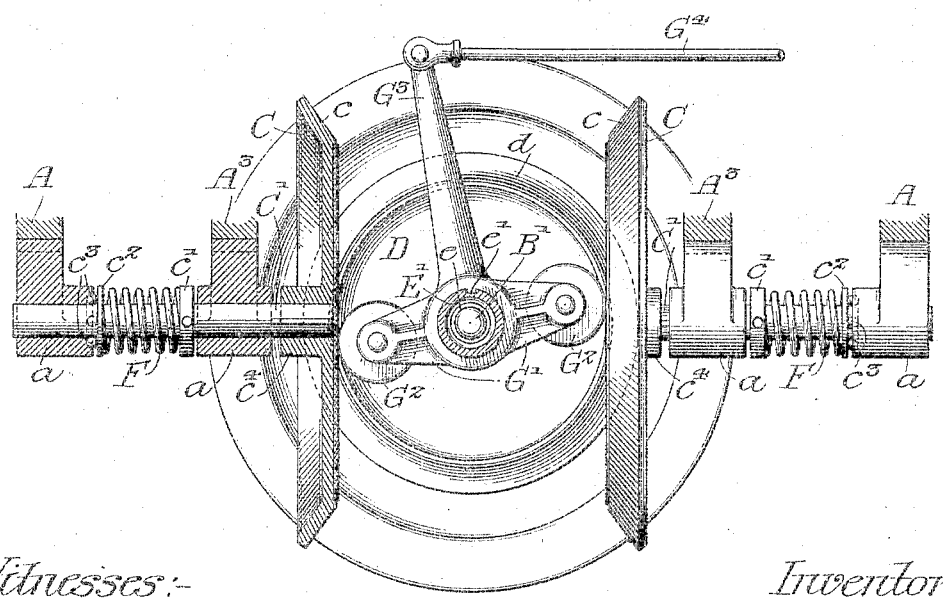

In the drawings, Figure 1 is a top plan view, with parts shown in section, of a frictional power-transmission device embodying our invention and the supporting-frame therefor. Fig. 2 is a longitudinal section thereof, taken on line 2 2 of Fig. 1. Fig. 3 is a transverse section taken on line 3 3 of Fig. 1. Figs. 4 and 5 are top plan views of modified constructions, the latter showing an alternative arrangement of the executive elements of the device.

As shown in the drawings, the supporting-frame for the device consists of longitudinal frame members A A, transverse frame members A' A', oblique braces $A^2$ $A^2$, and short longitudinal frame-pieces $A^3$ $A^3$, supported at their ends on the rear transverse frame member A' and at their forward ends from the side frame member through the means of short transverse braces $A^4$ $A^4$.

B designates a motor or prime mover which is supported on cross-bars $A^5$ $A^5$, extending between and attached to the oblique frame members $A^2$, and B' designates the rotative shaft of said motor through which power is transmitted to the machinery to be driven. Said shaft carries a fly or balance wheel $B^2$.

C C designate two flat rotative disks which are located one on each side of the plane of the axis of the motor-shaft and face each other, with the planes of their inner or adjacent faces parallel with the plane of the axis of the motor-shaft. Said disks C are affixed to and turn with short shafts C', disposed transversely to the motor-shaft, and said shafts C' are journaled in bearings $a$, attached to the frame members A $A^3$ at the sides of the frame. Said friction-disks C are driven from the motor-shaft B' through the medium of a suitable driving-gear, herein shown as consisting of a friction-wheel D, which is fixed to the motor-shaft and turns therewith. Said driving-wheel D is feathered to said shaft, whereby it is capable of sliding thereon.

As shown in Figs. 1 to 3, the friction-wheel D is provided with a peripheral beveled friction-surface $d$, which engages the like-shaped peripheries $c$ of the friction-disks C. E designates a friction-wheel which is interposed between the friction-disks C and is adapted for contact at its periphery with the adjacent flat faces of the disks, whereby said wheel is driven by said disks. Said friction-wheel E is non-rotatively mounted on a hollow shaft or sleeve E', which latter is fixed to a shaft $E^2$, which is journaled in a bearing $a'$, carried by the adjacent transverse frame member A'. The shaft $E^2$ is designed to be connected in a manner not shown with the part or parts to which power is transmitted by the device herein shown. The sleeve E' abuts at its rear end against the shaft-bearing $a'$ and extends forwardly toward the motor-shaft B'. At its forward open end it is provided with a bushing $e$, in which the rear end of the motor-shaft is journaled, as more clearly shown in Fig. 2. The friction-wheel E is movable longitudinally of the sleeve E', on which it is mounted, whereby said wheel may be shifted toward and from the centers of the disks C, and the range of movement of said wheel E is sufficient to permit the same to be shifted past the centers of said disks, as shown in dotted lines in Fig. 1. For this purpose said sleeve is provided with an exterior feather-groove $e'$, which is engaged by a complemental interior feather in the hub $e^2$ of the wheel E. Said hub is provided with an annular groove, which is adapted to receive the forked end of a shipping-lever, (not shown,) by which said friction-wheel E may be shifted on said sleeve E' toward and from the centers of the friction-disks C. The said friction-disks C are held yieldingly in contact with the periphery of the frictionally-driven wheel E by means of spiral backing-springs F F, which, as herein shown, surround the shafts C' of said disks and are interposed between collars $c'$ on said shafts and the outer bearing-boxes $a$ for said shafts. The outer ends of said springs preferably bear against rotative washers $c^2$ on said shafts, and antifriction-balls $c^3$ are interposed between said washers and the adjacent bearing-boxes.

Means are provided for spreading the friction-disks C apart to release the same from engagement with the periphery of the friction-driven wheel E, and thereby disconnect the driven shaft $E^2$ from the motor. The spreading device for this purpose is made as follows:

Carried on the inner end of the hub $b'$ of the driving friction-wheel D is a sleeve G, which is free to rotate on said hub. Said sleeve is provided with two oppositely-directed arms G' G', in the outer ends of which are rotatively mounted two small wheels $G^2$ $G^2$, which are adapted to bear against the flat inner faces of the friction-disks C. Said sleeve is provided with a rigid upwardly-directed operating-lever $G^3$, to the upper end of which is attached a pull-rod $G^4$, by which the lever is swung on its axis and the arms G' partially rotated. Said arms G' are made of such length that the distance between the outer margins of the wheels $G^4$ is greater than the distance between the inner faces of the disks C when engaged with the driven friction-wheel E, and at this time the arms occupy an inclined position, as shown in Fig. 2, with one wheel below and the other above the plane of the disk-centers. When said arms are swung into a more nearly horizontal position than shown, the wheels $G^2$, carried by said arms, engage the friction-disks C and spread the same outwardly or away from each other against the action of the backing-springs F, and thereby release said friction-disks from engagement with the friction-wheel E. A sufficient space is left between the hubs $c^4$ of the friction-disks C and the adjacent bearings $a$ (clearly shown in Figs. 1 and 4) to permit the required spreading movement of said friction-disks.

The beveled friction-wheel D has a limited movement longitudinally of the shaft B' and is held yieldingly against the friction-disks C by means of backing-springs H H, made of spiral form and shown as interposed between the balance-wheel $B^2$ and said friction-wheel D. Said springs H conveniently enter at their opposite ends suitably-formed sockets in the adjacent faces of said balance and friction wheels, as clearly shown in Figs. 1 and 2. The yielding engagement of said wheel D with the friction-disks maintains the proper frictional engagement between the parts, notwithstanding wear which may take place in the engaging surfaces thereof. An antifriction thrust-bearing $b$ is interposed between the fly or balance wheel and the frame of the engine to avoid undue friction between said parts, due to the pressure of the backing-springs H.

The operation of the device described is as follows: When the parts of the device are in position to transmit power from the motor-shaft to the shaft $E^2$, as shown in Fig. 1, the friction-disks C are pressed closely against the periphery of the friction-driven wheel E by their springs F, and the beveled friction driving-wheel D is pressed closely against the beveled friction-surfaces $c$ by the friction-disks C by the means of their backing-springs H. It is evident that when the parts are in the positions described rotation of the wheel D, which is effected by the motor-shaft, transmits rotary motion to the disks C in opposite directions—that is to say, one disk rotates in one direction and the other in the other. By reason of the engagement of said oppositely-rotating disks C with the opposite sides of the said wheel E said wheel is frictionally driven from said disks, whereby rotary motion is imparted thereto and the shaft $E^2$. By reason of the capability of the wheel E to be moved toward and from the centers of the disks the speed of said wheel and its shaft $E^2$ may be varied, since it is obvious that a greater speed is imparted to the wheel E when engaging the flat faces of the disks near the margins thereof than when running near the centers of said disks, and the change from the maximum to the minimum speeds varies gradually. Moreover, the direction of rotation of said wheel E and its shaft $E^2$ may be reversed by moving the friction-wheel E entirely past the centers of said disks to the position indicated in dotted lines in Fig. 1. When it is desired to disconnect the motor from the part being driven by the shaft $E^2$, the friction-disks C are spread apart by means of the spreading device described, said device being swung or rotated on its axis to swing the arms thereof toward a horizontal position in a manner to force the disks C away from each other and out of contact with the friction-wheel E. It will not be necessary to provide a great range of movement to separate the disks C, it only being necessary to force said disks apart sufficiently to release the same from the friction-wheel E. When the spreading device is released, the backing-springs F force the disks together into contact with the driven wheel E and the spreading device is swung into the inclined position. (Shown in Fig. 2.) By reason of the spring-pressed engagement of the driving-wheel D with the friction-disks C, afforded by the presence of the springs H when said friction-disks are spread apart to release the same from the driven wheel E, the said driving-wheel D is moved inwardly by the springs H, so as to follow the beveled friction-surfaces of the disks. When the disks C are again moved inwardly by the springs F, the driving-wheel D' is shifted forwardly against the action of their springs H. In the event of the use of other forms of gear connection between the wheel D and disks C the spring-pressed engagement therebetween may be omitted. Either one or both of each two contacting gears is provided on the engaging surface thereof with a friction-covering. Preferably and as herein shown the driving-gear of each two contacting gears is provided with such frictional covering. In the construction shown in Figs. 1 to 3, inclusive, therefore, the inner flat faces of the disks C are covered, while the beveled surface of the driving gear-wheel D is likewise covered.

In Fig. 4 we have shown a modification of the driving gear-wheel I, which rotates with the motor-shaft and frictionally drives the two opposing friction-disks J. In this construction the two opposing friction-disks have their peripheral surfaces disposed parallel with each other and with the axes of the disks. The driving-wheel I is made larger than the driving-wheel D of the previously-described construction and is adapted to bear with its flat rear face against the peripheries of the disks J and in this manner drives said disks.

In Fig. 5 is shown a modification wherein the arrangement of the driving and driven wheels is reversed as compared to the construction shown in Figs. 1 to 4, inclusive. In the latter construction the motor-shaft driving-wheel K is constructed to peripherally engage the inner or adjacent faces of the friction-disks C, which are made like the disks shown in Figs. 1 to 3, and said driving-wheel K is shiftable toward and from the centers of said disks in a manner to vary the rotative speed of the disks, while the driven wheel L, with which the shaft $E^2$ rotates, is provided with a beveled periphery, which engages the beveled peripheries of the friction-disks C. Said driving-wheel K is non-rotatively mounted on a sleeve M, which slides longitudinally thereof, and said sleeve M is keyed or otherwise fixed to the motor-shaft. The hub $k$ of said driving-wheel is grooved to receive the forked end of a shipping-lever, (not shown,) by which said driving-wheel may be shifted toward and from the centers of the disks C. The driven shaft $E^2$ is rotatively mounted in a suitable bearing in the adjacent frame member A', as in the previously-described construction, and extends at its inner end into and is journaled in a bushing $m$ in the rear end of the sleeve M. The beveled gear-wheel L is pressed against the friction-disks C by means of backing-springs N, interposed between said wheel and a plate or disk $n$, surrounding the shaft $E^2$ and bearing against the journal-bearing in the frame member A'.

In each of the two latter constructions the spreading device is the same as the construction heretofore described, with the exception that in the construction shown in Fig. 5 the spreading device is located at the rear end of the device. It is obvious that the operation of the two devices shown in Figs. 4 and 5 is essentially the same as that in the previously-described construction, with the exception that in the construction shown in Fig. 5 the speed of the driven part is varied by the movement of the driving-wheel toward and from the centers of the disks instead of by similar movement of the driven wheel, as in the previously-described constructions.

We claim as our invention—

1. In a frictional power-transmission device, the combination with a rotative driving-shaft and two rotative disks, one on each side of said shaft, and having inwardly-facing bearing-surfaces which are fixed parts of said disks, a wheel interposed between said disks and having peripheral engagement with the adjacent bearing-surfaces of both disks, a friction-wheel engaging the margins of said disks, means for yieldingly pressing both said disks toward each other and against the interposed wheel, and means for pressing said other friction-wheel against the margins of said disks, said interposed wheel being movable toward and from the centers of said disks.

2. In a frictional power-transmission device, the combination with a rotative driving-shaft, of two rotative disks, one on each side of said shaft, a wheel interposed between said disks and having peripheral engagement with the adjacent faces of both disks, a friction-wheel engaging the margins of said disks, means for yieldingly pressing said disks toward each other and against said interposed wheel, and means for spreading apart said disks to release the same from engagement with said interposed wheel, said interposed wheel being movable toward and from the centers of said disks.

3. In a frictional power-transmission device, the combination with a rotative driving-shaft, of two rotative disks, one on each side of said shaft, a wheel interposed between said disks and having peripheral engagement with the adjacent faces of both disks, a friction-wheel engaging the margins of said disks, means for yieldingly pressing said disks toward each other and against the interposed wheel, means for yieldingly pressing the other friction-wheel against the margins of said friction-disks, and means for spreading apart said disks to release the same from engagement with said interposed wheel, said interposed wheel being movable toward and from the centers of said disks.

4. In a frictional power-transmission device, the combination with two friction-disks rotating in parallel planes, a driving-shaft, a wheel on said driving-shaft which frictionally engages and drives said disks, a spring for holding said driving-wheel in contact with said disks, a friction-wheel located between and having peripheral engagement with said disks and driven thereby, means for spreading said disks to release the same from engagement with the driven wheel and backing-springs against the action of which said disks are spread apart.

5. In a frictional power-transmission device, the combination with two rotative disks which rotate in parallel planes, a driving-shaft, a wheel on said shaft having a beveled periphery which has frictional driving engagement with the beveled peripheries of said disks, backing-springs for holding the driving-wheel in engagement with said disks, a friction-wheel located between and having peripheral engagement with the adjacent faces of said disks and driven thereby, means for spreading apart said disks to release the same from engagement with the driven wheel and means for shifting said driven wheel toward and from the centers of said disks.

6. In a frictional power-transmission device, the combination with a driving-shaft, two rotative friction-disks, one on each side of said shaft, a wheel rotating with said driving-shaft and geared to rotate said disks, a shaft in alinement with said driving-shaft, a sleeve fixed to said shaft and provided in one end with a bearing in which one end of the driving-shaft is journaled and a friction-wheel non-rotative on said sleeve, said friction-wheel being located between and having peripheral engagement with said disks and driven thereby.

7. In a frictional power-transmission device, the combination with a driving-shaft, two rotative friction-disks, one on each side of said shaft, a wheel rotating with said driving-shaft and geared to rotate said disks, a shaft in alinement with said driving-shaft, a sleeve fixed to said shaft and provided in one end with a bearing in which one end of the driving-shaft is journaled and a wheel non-rotative on said sleeve and shiftable endwise thereof, said friction-wheel being located between and having peripheral engagement with said disks and driven thereby.

8. In a frictional power-transmission device, the combination with a driving-shaft, two rotative friction-disks, one on each side of said shaft, a wheel rotating with said driving-shaft and geared to rotate said disks, a shaft in alinement with said driving-shaft, a sleeve fixed to said shaft and provided in one end with a bearing in which one end of the driving-shaft is journaled and a wheel non-rotative on said sleeve, said friction-wheel being located between and having peripheral engagement with said disks and driven thereby, and means for spreading apart said disks to release the same from engagement with the driven wheel.

9. In a frictional power-transmission device, the combination with a driving-shaft, two rotative friction-disks, one on each side of said shaft, a wheel rotating with said driving-shaft and geared to rotate said disks, a shaft in alinement with said driving-shaft, a sleeve fixed to said shaft and provided in one end with a bearing in which one end of the driving-shaft is journaled, a wheel non-rotative on said sleeve, said friction-wheel being located between and having peripheral engagement with said disks and driven thereby, and means for spreading apart said disks to release the same from engagement with the driven wheel comprising a rocking frame mounted on said driving-shaft and provided with parts which engage the disks in a manner to spread the same when the frame is rocked on its axis.

10. In a frictional power-transmission device, the combination with a rotative driving-shaft, of two rotative disks, one on each side of said shaft and provided with inwardly-facing beveled margins, a wheel interposed between said disks and having peripheral engagement with the adjacent parallel faces of both disks, a second wheel having a beveled margin engaging the beveled margins of the friction-disks, means for yieldingly pressing said disks toward each other and against the interposed friction-wheel, means for yieldingly pressing said second friction-wheel against the beveled margins of said disks and permitting said last-mentioned wheel to move outwardly and inwardly, on the beveled margins of the friction-disks, as said disks are moved toward and away from each other, and means for spreading apart said disks to release the same from engagement with said interposed wheel, said interposed wheel being movable toward and from the centers of the disks.

11. In a frictional power-transmission device, the combination with two rotative disks having flat, parallel adjacent faces, a friction-wheel interposed between said disks and peripherally engaging the adjacent faces thereof, a shaft rotative with said wheel, means for shifting said wheel toward and from the centers of said disks, means for spreading said disks apart to release the same from said friction-wheel, and backing-springs against the action of which said disks are spread apart.

12. In a frictional power-transmission device, the combination with a rotative driving-shaft, two rotative disks, one on each side of said shaft, a wheel rotating with said shaft and driving said disks, a friction-wheel located between and engaging at its periphery the inner parallel faces of said disks and driven thereby, means for yieldingly pressing said disks toward each other and against the interposed friction-wheel, a shaft driven by said second wheel, means for spreading apart said disks to release the same from engagement with said frictionally-driven wheel, and means for reversing the direction of rotation of said frictionally-driven wheel.

In testimony that we claim the foregoing as our invention we affix our signatures, in presence of two witnesses, this 5th day of August, A. D. 1903.

IVERT LARSEN.
ROBERT HARDIE.

Witnesses:
WILLIAM L. HALL,
GEORGE R. WILKINS.